(12) United States Patent
Bal et al.

(10) Patent No.: US 9,192,923 B2
(45) Date of Patent: Nov. 24, 2015

(54) COKE RESISTANT SOLID CATALYST, PROCESS FOR THE PREPARATION THEREOF AND A PROCESS FOR VAPOUR PHASE DRY REFORMING OF METHANE

(71) Applicant: Council of Scientific & Industrial Research, New Delhi (IN)

(72) Inventors: Rajaram Bal, Dehradun (IN); Bipul Sarkar, Dehradun (IN); Chandrasekhar Pendem, Dehradun (IN); Rajib Kumar Singha, Dehradun (IN); Shankha Shubhra Acharyya, Dehradun (IN); Shilpi Ghosh, Dehradun (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/089,669

(22) Filed: Nov. 25, 2013

(65) Prior Publication Data

US 2014/0145117 A1     May 29, 2014

(30) Foreign Application Priority Data

Nov. 26, 2012    (IN) .......................... 3614/DEL/2012

(51) Int. Cl.
| | |
|---|---|
| *C01B 3/26* | (2006.01) |
| *B01J 29/46* | (2006.01) |
| *C01B 3/40* | (2006.01) |
| *B01J 35/00* | (2006.01) |

(52) U.S. Cl.
CPC ................ *B01J 29/46* (2013.01); *B01J 35/002* (2013.01); *C01B 3/40* (2013.01); *B01J 2229/186* (2013.01); *C01B 2203/0238* (2013.01); *C01B 2203/1058* (2013.01); *C01B 2203/1082* (2013.01); *C01B 2203/1094* (2013.01); *C01B 2203/1241* (2013.01)

(58) Field of Classification Search
CPC .... C01B 3/26; C01B 3/40; C01B 2203/0238; C01B 2203/1241; C01B 2203/1058; C01B 2203/1082; C01B 2203/1094; B01J 29/46; B01J 2229/186; B01J 35/002
USPC .................... 48/198.1, 198.7, 198.8; 502/300
See application file for complete search history.

(56) References Cited

U.S. PATENT DOCUMENTS

| | | | | |
|---|---|---|---|---|
| 4,717,782 | A * | 1/1988 | Garwood et al. | ............. 585/531 |
| 2006/0144759 | A1 * | 7/2006 | Wakui | ...................... 208/120.01 |
| 2007/0253886 | A1 | 11/2007 | Abatzoglou et al. | |

OTHER PUBLICATIONS

Zhang et al. "Preparation of La2NiO4/ZSM-5 catalyst and catalytic performance in CO2/CH4 reforming to syngas" 2005, Applied Catalysis A: General 292, 138-143.*

(Continued)

*Primary Examiner* — Stanley Silverman
*Assistant Examiner* — Syed Iqbal
(74) *Attorney, Agent, or Firm* — Knobbe, Martens, Olson & Bear, LLP

(57) ABSTRACT

The present invention provides a coke resistant catalyst and process for sequestration of carbon dioxide via reforming of methane to synthesis gas (a mixture of CO and $H_2$). The process provides a direct single step selective vapor phase carbon dioxide reforming of methane to syngas over gadolinium promoted mesoporous Ni-ZSM catalyst. The process provides almost 11-95% conversion of methane with $H_2$ to CO ratio of 0.82 to 1.

12 Claims, 4 Drawing Sheets

(56) References Cited

OTHER PUBLICATIONS

Mike Lancaster "Green Chemistry: An Introductory text", 2010, The Royal Society of Chemisty, p. 102.*

Kado, et al. 2001 "Low temperature reforming of methane to synthesis gas with direct current pulse discharge method" *Chemical Communications:* 415-416.

Nagaoka, et al. 2001 "Titania supported ruthenium as a coking-resistant catalyst for high pressure dry reforming of methane" *Catalysis Communications* 2(8): 255-260.

Peters, et al. 2011 "Nickel-loaded zirconia catalysts with large specific surface area for high-temperature catalytic applications" *ChemCatChem* 3: 598-606.

Sarusi, et al. 2011 "$CO_2$ reforming of $CH_4$ on doped Rh—$Al_2O_3$ catalysts" *Catalysts Today* 171(1): 132-139.

Slade, et al. 2007 "Mixed-conducting oxygen permeable ceramic membranes for the carbon dioxide reforming of methane" *Green Chemistry* 9: 577-581.

Xu, et al. 2012 "One-pot synthesis of ordered mesoporous NiO—CaO—$Al_2O_3$ composite oxides for catalyzing $CO_2$ reforming of $CH_4$" *ACS Catalyst* 2: 1331-1342.

* cited by examiner

COKE RESISTANT SOLID CATALYST, PROCESS FOR THE PREPARATION THEREOF AND A PROCESS FOR VAPOUR PHASE DRY REFORMING OF METHANE

FIELD OF INVENTION

The present invention relates to a solid Gd promoted mesoporous Ni-ZSM-5 catalyst, process for the preparation thereof and a process for vapours phase dry reforming of methane with carbon dioxide for the production of syngas (mixture of carbon monoxide and hydrogen). Particularly, the present invention relates to a process for the carbon dioxide reforming of methane to syngas over a Gd promoted Ni-ZSM-5 solid catalysts. More particularly, the present invention relates to a process for the vapour phase carbon dioxide reforming of methane to syngas by using a coke resistant Gd promoted Ni-ZSM-5 catalyst.

BACKGROUND OF THE INVENTION

The world's demand for energy continues to grow due to population growth and improving standards of living. At the same time, the days of fossil fuel and gas are diminishing constantly. Although, the existing resources will be able to meet the global demand of fuel and chemicals for next two decades. Time has come to discover alternative resources for potential future fuel and more efficient up gradation of natural fuel resources. Globally, there are abundant supplies of natural gas, much of which can be developed at relatively low cost. The current mean projection of global remaining recoverable resource of natural gas is 16,200 Trillion cubic feet (Tcf), 150 times current annual global gas consumption, with low and high projections of 12,400 Tcf and 20,800 Tcf, respectively. Natural gas is basically having a methane conc. of up to 85% alongside impurities such as sulphur and carbon dioxide as the chief impurities. Some time, it may contain sizeable amount of $CO_2$ (upto 25%) as impurity. Hence, any transformation requiring direct conversion of natural gas must be having robust catalytic system with least possible time bound deactivation.

The up gradation of methane or natural gas to valuable chemical feedstock proceeds through indirect routs by initial conversion to syngas (a mixture of carbon monoxide and hydrogen). The production of syngas can be carried out by steam reforming (SR) (very large scale process) and even through partial oxidation of methane (PDX). Although partial oxidation of methane have high methane conversion with excellent syngas selectivity and extremely fast reaction kinetics, but is suffer from local heat generation over the catalyst and safety issues. Whereas the SR do not suffer from those safety issues but steam reforming of methane produce $CO_2$ along with syngas which need to remove before its downstream GTL applications.

However, despite of unfavorable thermodynamics dry reforming of methane has some unique advantages; it can generate syngas at unite $CO/H_2$ ratio, moreover it becomes advantageous because of the use of two greenhouse gases at a time. Low quality natural gas can be utilized for syngas production in near future; even the source gas does not need any further purification. A fundamental option currently explored is to reduce $CO_2$ to chemicals and energy carriers using reduction equivalents from renewable resources. From this perspective the dry reforming of methane over metal based solid catalyst has drawn much attention in recent years and is now viewed as an area to produce ultra pure hydrogen or syngas for future fuel alternatives. As this would conceptually allow the efficient valuation of methane and the reforming technology requires the preparation of thermally stable and coke resistant $CO_2$ reforming catalyst. The conventional supported nickel catalyst used for methane reforming are very active for carbon formation leads to rapid deactivation of catalyst, while coke-resistance alternatives (Rh, Ru, Pt etc) are bounded by its availability and high cost. So economic boundary conditions dictate the use of Ni based catalysts. There are reports on dry reforming of methane over different solid catalyst but to the best of our knowledge there is no reference for the use of gadolinium (Gd) promoted Ni-ZSM-5 catalyst for this purpose.

ZSM-5 (ZEOLITE SOCONY MOBIL-5) is an aluminosilicate zeolite belonging to the pentasil family of zeolites. Its chemical formula is $Na_nAl_nSi_{96-n}O_{192}.16H_2O$ (0<n<27). Reference may be made to article in the Catalysis Today, 2011, 171, 132-139 by I. Sarusi et al. where they got about 19% methane conversion with $CO/H_2$ ration of over doped $Rh/Al_2O_3$ catalyst.

Reference may be made to article in the Green Chemistry, 2007, 9, 577-581 by S. Williams and his group reported the use of $O_2$ permeable ceramic membrane for the $CO_2$ reforming of methane to syngas. On this article they described a very high concentration of feed gas (notably 80% feed concentration) to get 28% methane conversion. The meanwhile it is been observed that the membrane reactor which catalyses the reaction itself get deactivated (50%) after 14 h.

Reference may be made to US patent no US2007/0253886A by Abatzoglou and his group. Where they used active metal (mainly Ni) deposited on non-porous metallic and ceramic support; the catalyst shows very high methane conversion of 98% at 800° C. with $CO/H_2$ ratio of 0.98. But the catalyst stability was limited up to 18 h time on stream.

Reference may be made to article in the Chem Cat Chem, 2011, 3, 593-606, in which Glaser et al and his group reported a highly stable and porous zirconia as support. With 5% Ni supported on $ZrO_2$ they achieved 75% methane conversion at 750° C. with a comparatively slow GHSV of $7.2 \times 10^4$ ml h$^{-1}$ g$^{-1}$.

Reference may be made to article in the Chemical Communication, 2001, 415-416 in which Japanese worker Fujimoto and his group reported the production of syngas by pulse irradiation technique on a mixture of $CH_4$ and $CO_2$ at low temperature and atmospheric pressure. They achieved almost 42% methane conversion with $H_2/CO$ ratio of 1.5 with 1:1.5 $CH_4$ to $CO_2$ feed ratio at 180° C. while in presence of NiMgO catalyst the same technique gives almost 69% methane conversion while the $H_2/CO$ ration goes down to 0.86 with 1:1 $CH_4$ to $CO_2$ feed ratio.

Reference may also be made to article in the ACS Catalysis, 2012, 2, 1331-1342, which Chou et al. reported a mesoporous tri-metallic composite of $NiO—CaO—Al_2O_3$ in the dry reforming of methane. In this report they found 89% of methane conversion at 750° C. whereas the GHSV is 15000 ml g$^{-1}$ h$^{-1}$. But the $H_2/CO$ ratio is only able to rise up to 0.88 at 750° C.

Reference may be made to article in the Catalysis Communication, 2001, 2, 255-260, in which Aika et al reported the use Ru supported titania catalyst over dry reforming of methane. At industrial condition, at 0.1 MPa and 800° C. the catalyst shows a stable activity for 25 h time on stream with $CO_2$ conversion of ~46%.

The drawback of the processes reported so far is that although they exhibit sufficiently high conversions of methane for high selectivity of syngas of unit $H_2/CO$ ratio but the rapid formation of coke causes deactivation of reforming catalyst. To overcome the deactivation many researchers used novel metals such as Pt, Ru, Rh etc but the rising cost and relatively poor availability desiccates the use of those catalyst in industrial purpose. On this economic boundation, Ni based catalyst will be the holy grail for methane reforming in coming future. There is, therefore, an evident necessity for further improvements in the Ni based catalyst and process for the dry reforming of methane with carbon dioxide.

OBJECTIVES OF THE INVENTION

The main object of the present invention is to provide a solid Gd promoted mesoporous Ni-ZSM-5 catalyst and a process for the preparation thereof and a process for vapours phase reforming of methane with carbon dioxide for the production of syngas.

Another object of the present invention is to provide a process which selectively gives syngas from methane and carbon dioxide with $CO/H_2$ ratio equal to 1.

Yet another object of the present invention is to provide a process and catalyst which uses two greenhouse gases at a time to produce syngas for future fuel alternatives.

Yet another object of the present invention is to provide a process which works continuously more than 40 h without any deactivation of reforming catalyst under continuous process for the production of syngas from dry reforming of methane.

Yet another object of the present invention is to provide a catalyst promoted by Gd and which can be prepared easily and also very economical to produce syngas from dry reforming of methane.

SUMMARY OF THE INVENTION

Accordingly the present invention provides solid Gd promoted mesoporous Ni-ZSM-5 catalyst which comprises Gd in the range of 0.01-0.5%, Ni in the range of 3-15% and the remaining being ZSM-5.

In one embodiment of the present invention solid Gd promoted mesoporous Ni-ZSM-5 catalyst is coke resistant up to 40 h under the reaction condition.

In an embodiment of the present invention a process for the preparation of solid Gd promoted mesoporous Ni-ZSM-5 catalyst, wherein the said process comprising the steps of;
a. providing ZSM-5 by known method;
b. reducing a Gd salt, preferably $Gd(NO_3)_3.6H_2O$ and a Ni salt preferably $Ni(NO_3)_3.6H_2O$ with a reducing agent preferably ethylene glycol at temperature ranging between 120-160° C. for a period ranging between 2-3 h followed by the addition of ZSM-5 as obtained in step (a) into it with continuous stirring for a period ranging between 0.5-1 h;
c. evaporating the mixture as obtained in step (b) to dryness at temperature ranging between 80-100° C. and kept for drying at temperature ranging between 120-160° C. for a period ranging between 6-12 h and followed by calcing it at temperature ranging between 450-750° C. for a period ranging between 4-8 h hrs to obtain solid Gd promoted mesoporous Ni-ZSM-5 catalyst.

In another embodiment of the present invention the weight ratio of Gd to Ni varied the range of 0.01 to 0.5%.

Still in another embodiment of the present invention weight ratio of Ni to ZSM-5 varied in the range of 3 to 15%.

Still in another embodiment of the present invention a process for vapours phase reforming of methane with carbon dioxide for the production of syngas using Solid Gd promoted mesoporous Ni-ZSM-5 catalyst, wherein the said process comprising the steps of;

a. placing Gd promoted mesoporous Ni-ZSM-5 catalyst in the centre of a reactor followed by reducing the catalyst by $H_2$ (10% $H_2$ in an inert gas preferably He) with the flow rate ranging between 5-10 ml/min for a period ranging between 1-2 h at temperature ranging between 650-750° C. to get reduced catalyst;
b. reacting methane with carbon dioxide (balance with He) over reduced catalyst as obtained in step (a) under atmospheric pressure, at a temperature of 650-800° C. with a gas hourly space velocity (GHSV, feed/$g_{catalyst}$ hour) in the range of 3000 to 40000 ml $g^{-1}$ $h^{-1}$ for a period of 1-40 hours to obtain syngas.

Still in another embodiment of the present invention molar ratio of $CH_4:CO_2:He$ is 1:1:8.

Still in another embodiment of the present invention reactor used in step (a) is a fixed bed reactor.

Still in another embodiment of the present invention the conversion of methane is in the range of 1-95%.

Still in another embodiment of the present invention the $H_2/CO$ ratio of syngas obtained in the range of 0.82-1.0.

DETAILED DESCRIPTION OF THE INVENTION

Figure 1:
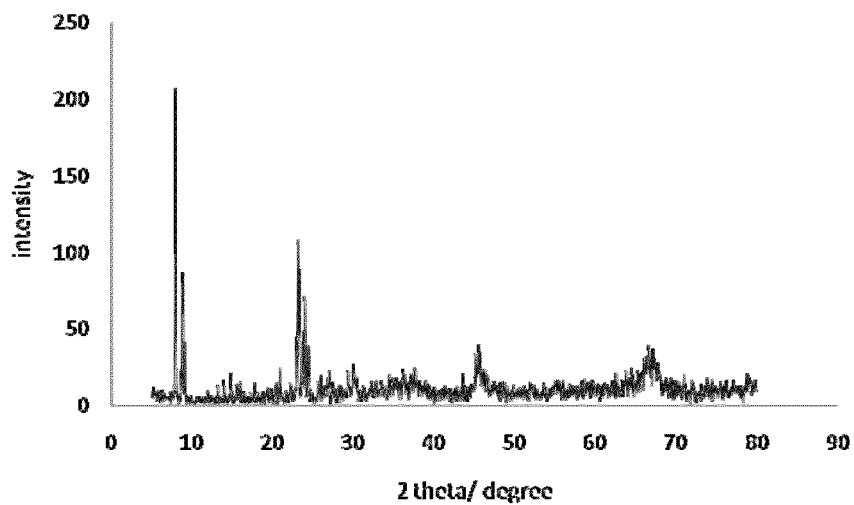
FIG. 1: XRD pattern of 0.2Gd-5% Ni-ZSM-5 shows the main peaks at 7.9, 8.8, 8.9, 23.1, 23.3 and 23.7° (2θ) are due to the ZSM-5 support (JCPDS card no-44-0003). Two diffraction peaks at 2θ=35.7 and 37.3° corresponding to NiO species been found.
Figure 2:
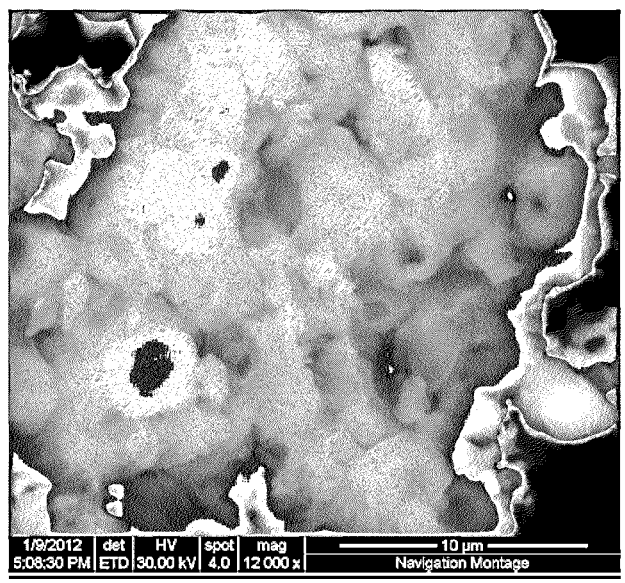
FIG. 2: SEM image shows that typical images of ZSM-5 support.
Figure 3:
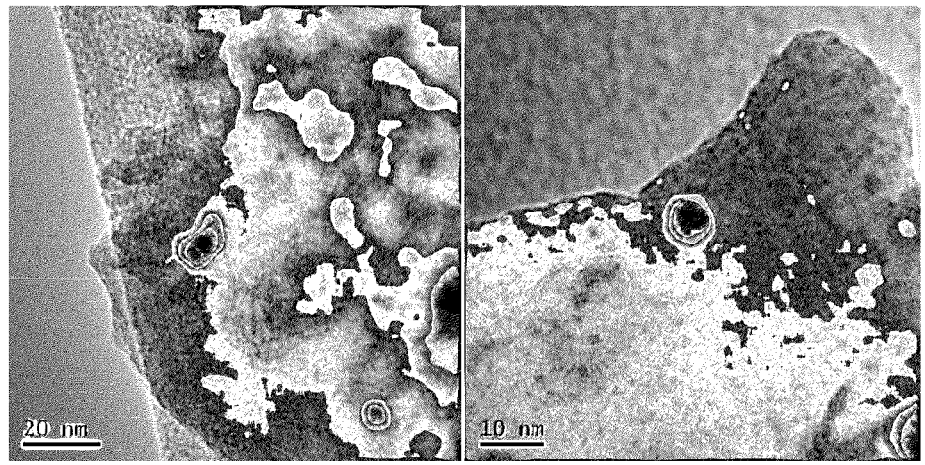
FIG. 3: High resolution transmission electron microscopy (HRTEM) revealed higher loading of Ni keeping Gd amount same cases agglomeration of Gd—Ni species with an average width of 6-8 nm Whereas very poor desperation of Gd—Ni species was also visible in that occasion.
Figure 4:
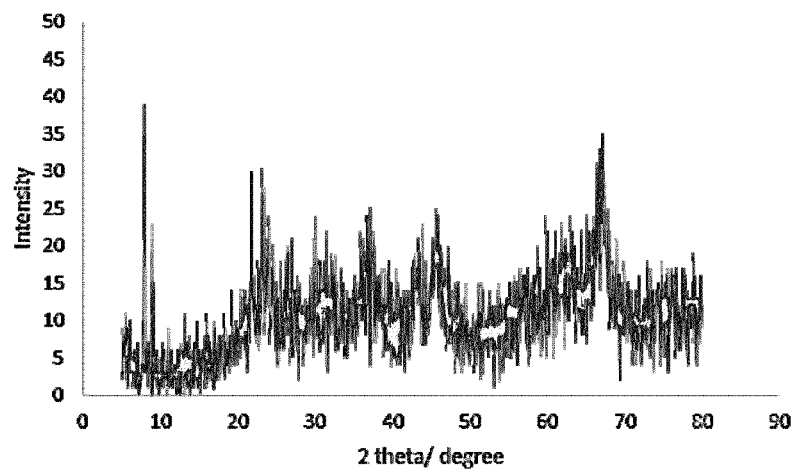
FIG. 4: XRD pattern of 0.2Gd-5% Ni-ZSM-5 shows the main peaks at 7.9, 8.8, 8.9, 23.1, 23.3 and 23.7° (2θ) are due to the ZSM-5 support (JCPDS card no-44-0003). No individual peak for Ni is observed, which may be due to the low loading of Ni salt.
Figure 5:
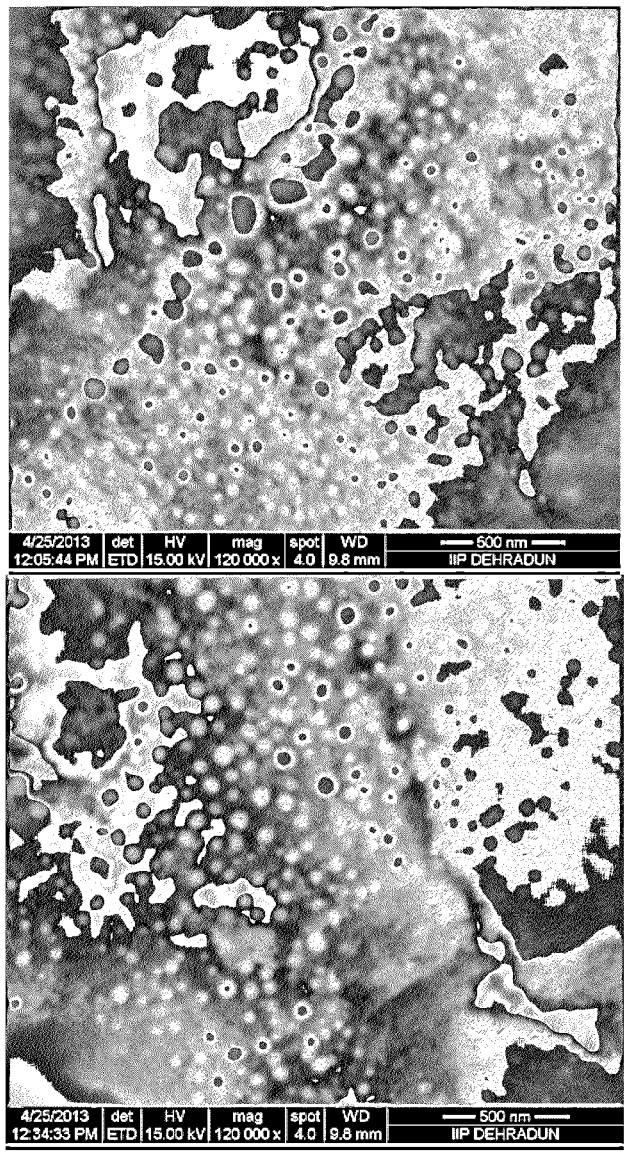
FIG. 5: SEM image shows that uniform Gd—Ni species with diameter around 4-8 nm was uniformly dispersed over support ZSM-5.
Figure 6:
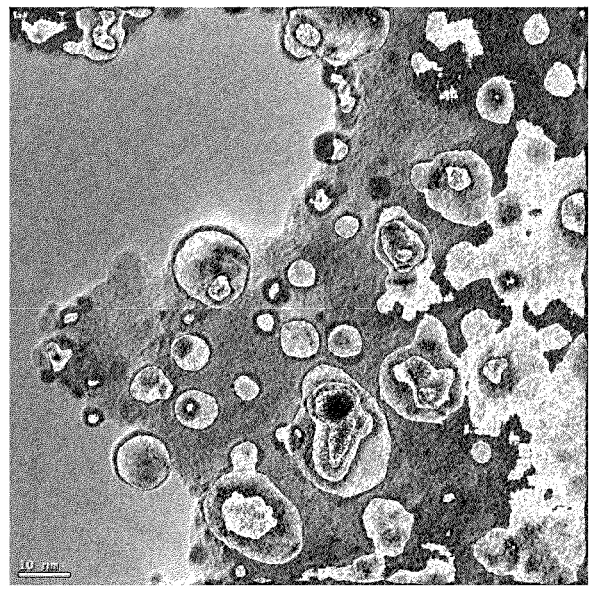
FIG. 6: High resolution transmission electron microscopy (HRTEM) revealed with appropriate loading of Ni keeping Gd amount same cases high dispersion of Gd—Ni species with an average width of 4-8 nm.
Figure 6:
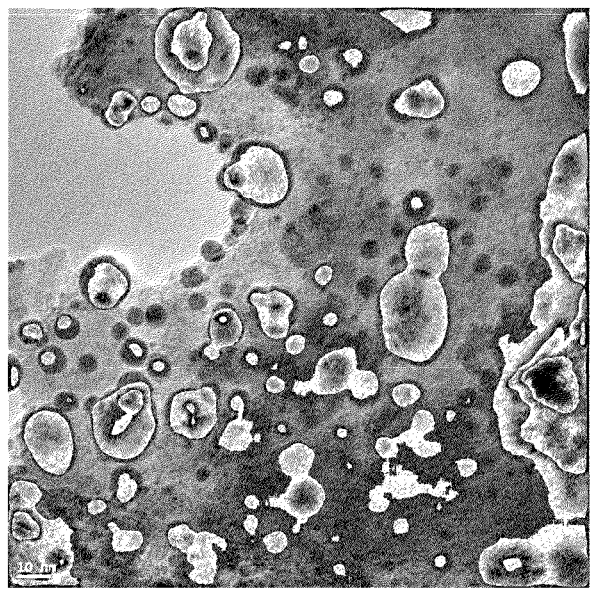

The present invention provides a catalyst and process for the production of syngas from dry reforming of methane under atmospheric pressure over Gd promoted mesoporous Ni-ZSM-5 catalyst which involves the following steps Synthesis of mesoporous ZSM-5 using adequate amount of $NaAlO_2$, tetrapropylammonium hydroxide (TPAOH), tetraethyl orthosilicate (TEOS), cationic copolymer Poly (diallyldimethylammonium chloride) with sufficient amount of water hydrothermally treated at 180° C. for 7 days for crystallization and finally filtered and washed with cold water; dried overnight and calcined at 650° C. for 3 hrs to remove the template.

Synthesis of Gd promoted Ni-ZSM-5 catalyst using the colloidal route of synthesis of Gd—Ni nanoparticle followed by successful dispersion over previously prepared mesoporous ZSM-5 (Na form) where the weight ratio of Gd to Ni varied the range of 0.01 to 0.5.

1. The weight ratio of Ni to mesoporous ZSM-5 varied in the range between 3-15%.
2. Calcination of the materials at was done in the range of 450-750° C. for 4-8 h.
3. Dry reforming of methane was carried out in a fixed bed down-flow reactor using methane (99.999% of purity) and carbon dioxide (99.9% of purity) as feeds for 1 to 40 h to get syngas.

The process pressure is kept at 1 atm.

The reaction temperature is preferably in the range 650-800° C.

The gas hourly space velocity (GHSV) is preferably in the range 10000 to 30000 ml $g^{-1}$ $h^{-1}$.

The methane conversion is obtained 10-98 mol % and $H_2/CO$ ratio of 0.98.

General Procedure for the Dry Reforming of Methane:

The dry reforming of methane was carried out in a fixed-bed down flow reactor at atmospheric pressure. Typically 200 mg of catalyst was placed in between two quartz wool plugged in the centre of the 6 mm quartz reactor. The catalyst was reduced in $H_2$ (10% $H_2$ in He) with the flow rate of 10 ml/min for 3 h at 700° C. After the reduction the temperature was changed and dry reforming of methane was carried out at different temperature (650-900° C.). The gas hourly space velocity (GHSV) was varied between 10000 ml $g^{-1}$ $h^{-1}$ to 30000 ml $g^{-1}$ $h^{-1}$ with a molar ratio of $CH_4:CO_2:He$ of 1:1:8. The reaction products were analysed using an online gas chromatography (Agilent 7890A) fitted with a TCD detector using two different columns Molecular sieves (for analysing $H_2$) and PoraPack-Q (for analysing $CH_4$, $CO_2$ and CO).

The following examples are given by way of illustration of working of the invention in actual practice and should not be constructed to limit the scope of the present invention in any way.

Example-1

An aqueous solution of $NaAlO_2$ (0.08 g) was added with 7 ml 25% tetrapropylammonium hydroxide (TPAOH). Subsequently, 7.0 ml tetraethyl orthosilicate (TEOS) was added and the mixture was aged at 100° C. under vigorously stirring for 2 h. The pH of the solution was observed in between 9-10. Then a cationic copolymer Poly (diallyldimethylammonium chloride) (PDDAM) was added (4 g) into the precursors. The resultant mixture was kept for at stirring for 12 h at 35° C. Finally the content was transferred in to stainless steel lined autoclave for hydrothermal synthesis at 180° C. for 7 days.

The resultant mixed species was washed with ethanol, and dried at 110° C., for 24 hours, followed by calcination at 650° C. for 5 h to obtain ZSM-5. (Reference: 21.
  F. S. Xiao, L. Wang, C. Yin, K. Lin, Y. Di, J. Li, R. Xu, D. S. Su, R. Schlogl, T. Yokoi, and T. Tatsumi, Angew. Chem. Int. Ed., 45, (2006), 3090)

The impregnation of Gd—Ni was done following colloidal method. Where a given amount of $Gd(NO_3)_3.6H_2O$ (0.0115 g) was taken with given amount of $Ni(NO_3)_3.6H_2O$ (0.98 g) into 20 ml ethylene glycol and reduced at 160° C. for 3 h. The reagents were added maintaining the following molar ratio:
  Gd:Ni:ethylene glycol=1:230:4000

The content was added into previously prepared ZSM-5 (2 g) and continuously stirred for 30 min. Then the mixture was evaporated to dryness at 100° C. and kept for drying at 120° C. for 6 hrs. Then the material was calcined in air atmosphere at 750° C. for 4 h.

The catalyst can be denoted as % Gd-% Ni-ZSM-5 (0.2 wt % Gd, 10% Ni). The catalyst was characterized by PXRD, SEM, TEM.

Example-2

An aqueous solution of $NaAlO_2$ (0.08 g) was added with 7 ml 25% tetrapropylammonium hydroxide (TPAOH). Subsequently, 7.0 ml tetraethyl orthosilicate (TEOS) was added and the mixture was aged at 100° C. under vigorously stirring for 2 h. The pH of the solution was observed in between 9-10. Then a cationic copolymer Poly (diallyldimethylammonium chloride) (PDDAM) was added (4.0 g) into the precursors. The resultant mixture was kept for at stirring for 12 h at 35° C. Finally the content was transferred in to stainless steel lined autoclave for hydrothermal synthesis at 180° C. for 7 days.

The resultant mixed species was washed with ethanol, and dried at 110° C., for 24 hours, followed by calcination at 650° C. for 5 h to obtain ZSM-5. (Reference: 21.
  F. S. Xiao, L. Wang, C. Yin, K. Lin, Y. Di, J. Li, R. Xu, D. S. Su, R. Schlogl, T. Yokoi, and T. Tatsumi, Angew. Chem. Int. Ed., 45, (2006), 3090)

The impregnation of Gd—Ni was done following colloidal method. Where a given amount of $Gd(NO_3)_3.6H_2O$ (0.0115 g) was taken with given amount of $Ni(NO_3)_3.6H_2O$ (0.49 g) into 20 ml ethylene glycol and reduced at 160° C. for 3 h. The reagents were added maintaining the following molar ratio:
  Gd:Ni:ethylene glycol=1:115:4000.

The content was added into previously prepared ZSM-5 (2 g) and continuously stirred for 30 min. Then the mixture was evaporated to dryness at 100° C. and kept for drying at 120° C. for 6 hrs. Then the material was calcined in air atmosphere at 750° C. for 4 h.

The catalyst can be denoted as % Gd-% Ni-ZSM-5 (0.2 wt % Gd, 5% Ni). The catalyst was characterized by PXRD, SEM, TEM.

Example-3

This example describes the production of syngas from dry reforming of methane by gas phase reaction in presence of Gd promoted mesoporous Ni-ZSM-5 as catalyst.
Process Conditions
Catalyst: 0.2 g
Gd:Ni weight ratio in the catalyst=0.2:5
Process pressure: 1 atm
Gas hourly space velocity (GHSV): 10000 ml $g^{-1}$ $h^{-1}$
Temperature: 800° C.
Reaction time: 1 h
Product Analysis:
Methane conversion: 95.1%
$H_2/CO$ ratio: 0.96

Example-4

The example describes the effect of temperature on conversion and $H_2/CO$ ratio of dry reforming of methane. The product analysis presented in Table-1.
Process Conditions:
Catalyst: 0.2 g
Gd:Ni weight ratio in the catalyst=0.2:5
Process pressure=1 atmosphere
Gas hourly space velocity (GHSV): 10000 ml $g^{-1}$ $h^{-1}$
Reaction time: 1 h

TABLE 1

Effect of temperature on conversion of methane and $H_2/CO$ ratio of dry reforming of methane

| Temperature (° C.) | Methane Conversion | Syngas |
|---|---|---|
| 650 | 36.2 | 0.87 |
| 700 | 55.2 | 0.98 |
| 750 | 69.8 | 0.96 |
| 800 | 95.1 | 0.91 |

Example-5

The example describes the effect of time on stream on conversion of methane and $H_2/CO$ ratio of dry reforming of methane. The product analysis presented in Table 2
Process Conditions:
Catalyst: 0.2 g
Gd:Ni weight ratio in the catalyst=0.2:5
Process pressure: 1 atm
Gas hourly space velocity (GHSV): 10000 ml g$^{-1}$ h$^{-1}$
Reaction temperature: 800° C.

TABLE 2

| Time-on-stream | Methane conversion | $CO_2$ conversion |
|---|---|---|
| 1 | 95.1 | 95.5 |
| 2 | 94.5 | 95.6 |
| 4 | 95.4 | 95.1 |
| 6 | 95 | 95.3 |
| 8 | 95.4 | 94.3 |
| 10 | 95.3 | 95.7 |
| 12 | 94.1 | 94.9 |
| 14 | 94.3 | 94.1 |
| 16 | 94.3 | 93.6 |
| 18 | 94.5 | 92.3 |
| 20 | 94 | 93.2 |
| 22 | 94.9 | 92 |
| 24 | 94.2 | 93.7 |
| 26 | 94.1 | 93.1 |
| 28 | 94.2 | 93.4 |
| 30 | 94.5 | 93.3 |
| 32 | 94.6 | 94 |
| 34 | 93.9 | 93.2 |
| 36 | 93.8 | 92.9 |
| 38 | 93.1 | 92.5 |
| 40 | 92.9 | 92.3 |

Example-6

The example describes the effect of gas hourly space velocity on the conversion of methane and $H_2/CO$ ratio of dry reforming of methane. The product analysis presented in Table-3.
Process Conditions:
Catalyst: 0.2 g
Gd:Ni weight ratio in the catalyst=0.2:5.
Process pressure: 1 atm
Temperature: 800° C.
Reaction time: 1 h

TABLE 3

Effect of gas hourly space velocity (GHSV) on the conversion of methane and $H_2/CO$ ratio of dry reforming of methane

| GHSV | Methane Conversion | $H_2/CO$ ratio |
|---|---|---|
| 3000 | 96.4 | 0.82 |
| 5000 | 95.6 | 0.87 |
| 10000 | 95.1 | 0.91 |
| 20000 | 83.6 | 0.94 |
| 30000 | 66.8 | 0.94 |
| 40000 | 50.7 | 1.0 |

The main advantages of the present invention are:
1. The catalyst does not deactivate till 40 h without any coke deposition
2. The process of the present invention is to convert methane to syngas by $CO_2$ reforming of methane in a single step with a single catalyst.
3. The process provides not only good conversion but also good $H_2/CO$ ratio of syngas.
4. The process utilizes two major greenhouse gases at a time to produce syngas with $H_2/CO$ ratio almost equal to unity, which become the major advantages of this process.
5. The process does not produce any major by-products which is also a major advantage of this process.
6. The catalyst shows no deactivation up to 40 h time on stream at 800° C.; which supports the thermal stability of the catalyst.
7. The catalyst is used in very low amounts.

We claim:
1. A process for the preparation of a solid Gd promoted mesoporous Ni-ZSM-5 catalyst, wherein ZSM-5 is $Na_n$-$Al_nSi_{96-n}O_{192}.16H_2O$ (0<n<27), which comprises Gd in the range of 0.01-0.5%, Ni in the range of 3-15% and the remaining being ZSM-5, said process comprising the steps of:
  a. providing ZSM-5;
  b. reducing a Gd salt and a Ni salt with a reducing agent at a temperature ranging between 120-160° C. for a period ranging between 2-3 h followed by addition of ZSM-5 as obtained in step (a) with continuous stirring for a period ranging between 0.5-1 h;
  c. evaporating the mixture as obtained in step (b) to dryness at a temperature ranging between 80-100° C., further drying at a temperature ranging between 120-160° C. for a period ranging between 6-12 h, followed by calcing the dried mixture at a temperature ranging between 450-750° C. for a period ranging between 4-8 hrs to obtain the solid Gd promoted mesoporous Ni-ZSM-5 catalyst.
2. The process as claimed in claim 1, wherein the % weight of Gd is in the range of 0.01 to 0.5%.
3. The process as claimed in claim 1, wherein % weight of Ni is in the range of 3 to 15%.
4. The process of claim 1, wherein the Gd salt is $Gd(NO_3)_3$.
5. The process of claim 1, wherein the Ni salt is $Ni(NO_3)_3.6H_2O$.
6. The process of claim 1, wherein the reducing agent is ethylene glycol.
7. A process for vapor-phase dry reforming of methane with carbon dioxide for the production of syngas using a Solid Gd promoted mesoporous Ni-ZSM-5 catalyst, wherein ZSM-5 is $Na_nAl_nSi_{96-n}O_{192}.16H_2O$ (0<n<27), which comprises Gd in the range of 0.01-0.5%, Ni in the range of 3-15% and the remaining being ZSM-5, said process comprising the steps of:
  a. placing the Gd promoted mesoporous Ni-ZSM-5 catalyst in the center of a reactor followed by reducing the catalyst with 10% $H_2$ in an inert gas with a flow rate of the mixture of $H_2$ in the inert gas ranging between 5-10 ml/min for a period ranging between 1-2 h at a temperature ranging between 650-750° C. to produce reduced catalyst;

b. reacting methane with carbon dioxide (in the inert gas) over the reduced catalyst as obtained in step (a) under atmospheric pressure, at a temperature of 650-800° C. with a gas hourly space velocity (GHSV, feed/$g_{catalyst}$/hour) in the range of 3000 to 40000 ml $g^{-1}$ $h^{-1}$ for a period of 1-40 hours to obtain syngas.

8. The process of claim 7, wherein the inert gas is He.

9. The process as claimed in claim 7, wherein the reactor used in step (a) is a fixed bed reactor.

10. The process as claimed in claim 7, wherein the conversion of methane is in the range of 1-95%.

11. The process as claimed in claim 7, wherein the $H_2/CO$ ratio of syngas obtained in the range of 0.82-1.0.

12. The process as claimed in claim 8, wherein the molar ratio of methane:carbon dioxide:He is 1:1:8.

* * * * *

UNITED STATES PATENT AND TRADEMARK OFFICE
CERTIFICATE OF CORRECTION

PATENT NO. : 9,192,923 B2
APPLICATION NO. : 14/089669
DATED : November 24, 2015
INVENTOR(S) : Rajaram Bal et al.

Page 1 of 1

It is certified that error appears in the above-identified patent and that said Letters Patent is hereby corrected as shown below:

On the title page
In column 1 (page 2, item 56) at line 4, under Other Publications, change "Chemisty," to --Chemistry,--.
In column 2 (page 2, item 56) at line 10, under Other Publications, change "Al$_2$0$_3$" to --Al$_2$O$_3$--.
In the specification
In column 2 at line 18, after "of" insert --$\geq$2--.
In column 2 at line 51, before "which" insert --in--.
In column 3 at line 55, change "calcing" to --calcining--.
In column 4 at line 54, after "steps" insert --.--.
In column 5 at line 31 (approx.), change "PoraPack-Q" to --PoraPak-Q--.
In column 5 at line 46, change "(PDDAM)" to --(PDDA)--.
In column 5 at line 55, after "3090)" insert --.--.
In column 5 at line 61 (approx.), after "4000" insert --.--.
In column 6 at line 13, change "(PDDAM)" to --(PDDA)--.
In column 6 at line 22, after "3090)" insert --.--.
In column 8 at line 12 (approx.), after "deposition" insert --.--.
In the claims
In column 8 at line 44, in Claim 1, change "calcing" to --calcining--.

Signed and Sealed this
Ninth Day of August, 2016

Michelle K. Lee
*Director of the United States Patent and Trademark Office*